US012767153B2

(12) United States Patent
Gansch et al.

(10) Patent No.: US 12,767,153 B2

(45) Date of Patent: Oct. 20, 2026

(54) METHOD, COMPUTING UNIT, AND COMPUTER PROGRAM FOR CREATING A MEASURING SYSTEM

(71) Applicant: Robert Bosch GmbH, Stuttgart (DE)

(72) Inventors: Roman Gansch, Renningen (DE); Andreas Heyl, Weil der Stadt (DE)

(73) Assignee: Robert Bosch GmbH, Stuttgart (DE)

(*) Notice: Subject to any disclaimer, the term of this patent is extended or adjusted under 35 U.S.C. 154(b) by 80 days.

(21) Appl. No.: 18/900,783

(22) Filed: Sep. 29, 2024

(65) Prior Publication Data

US 2025/0115257 A1 Apr. 10, 2025

(30) Foreign Application Priority Data

Oct. 6, 2023 (DE) ..................... 10 2023 209 768.0

(51) Int. Cl.
*B60W 50/02* (2012.01)

(52) U.S. Cl.
CPC .... *B60W 50/0205* (2013.01); *B60W 50/0225* (2013.01); *B60W 2050/021* (2013.01)

(58) Field of Classification Search
CPC ......... B60W 50/0205; B60W 50/0225; B60W 2050/021; G01S 7/40; G01S 7/497; G01S 2013/9323; G01S 13/867; G01S 13/931; G01S 17/86; G01S 17/931; G01D 3/08; G01D 21/02; G01V 11/00; G06N 7/01; G06N 20/00
See application file for complete search history.

(56) References Cited

U.S. PATENT DOCUMENTS

| | | | | |
|---|---|---|---|---|
| 2015/0205760 | A1 | 7/2015 | Hershey et al. | |
| 2015/0266488 | A1* | 9/2015 | Solyom ................. | B60W 10/04 701/28 |
| 2016/0320291 | A1 | 11/2016 | Najjar et al. | |
| 2019/0138423 | A1 | 5/2019 | Agerstam et al. | |
| 2020/0353942 | A1* | 11/2020 | Abt ..................... | B60W 50/045 |

FOREIGN PATENT DOCUMENTS

| | | |
|---|---|---|
| DE | 10 2015 202 554 B3 | 6/2016 |
| DE | 10 2015 220 355 A1 | 4/2017 |
| DE | 10 2019 217 257 A1 | 5/2021 |
| DE | 10 2021 113 767 A1 | 12/2022 |
| DE | 10 2021 206 297 A1 | 12/2022 |

* cited by examiner

*Primary Examiner* — Michael V Kerrigan

(74) *Attorney, Agent, or Firm* — Maginot, Moore & Beck LLP

(57) ABSTRACT

A method for creating a measuring system having at least two measuring devices is disclosed. The method includes (i) identifying at least one ambient condition affecting a function of the at least two measuring devices of the measuring system, (ii) determining the failure probability of the measuring system in the presence of the at least one identified ambient condition, taking into account a positive and/or a negative error dependency between the at least two measuring devices, (iii) adjusting at least one of the at least two measuring devices such that the negative error dependence between the at least two measuring devices is increased, (iv) and creating the measuring system having the at least two measuring devices.

10 Claims, 3 Drawing Sheets

METHOD, COMPUTING UNIT, AND COMPUTER PROGRAM FOR CREATING A MEASURING SYSTEM

This application claims priority under 35 U.S.C. § 119 to patent application no. DE 10 2023 209 768.0, filed on Oct. 6, 2023 in Germany, the disclosure of which is incorporated herein by reference in its entirety.

The present disclosure relates to a method for creating a measuring system as well as a computing unit and a computer program for carrying out the method.

BACKGROUND

A frequently used solution for making measuring systems error tolerant is the use of redundancy concepts. Selected processing channels (e.g., measuring devices) are performed twice and the results thereof are checked for consistency. As a result, errors in one of the processing channels can be identified and the system can respond accordingly. However, said redundancy concepts only work if the processing channels are ensured to be independent from one another. In conventional measuring systems, the failures of which are predominately due to hardware failures, heating of electrical components or a failure of the power supply, for example, can lead to a common cause of failure ("common cause"). In order to avoid said failures, the relevant safety standards, e.g., ISO 26262 as a global standard for the safety of road vehicles, recommend that a so-called "dependent failure analysis" be carried out.

For highly complex measuring systems such as a perception system for highly automated driving, the standard ISO 21448 additionally requires an assessment of external influences or predictable misuse ("triggering conditions") on the functionality of the system. The external influences may be, for example, weather influences, light conditions, etc., leading to the applied perception or evaluation algorithm no longer being capable of robustly detecting objects. Here, too, the focus is usually placed on avoiding common cause failures, i.e., attempts are made to avoid positive dependencies in redundant perception devices and to design said devices to be independent of one another.

SUMMARY

According to the disclosure, a method is proposed for creating a measuring system having at least two measuring devices and a computing unit and a computer program for carrying out the method having the features set forth below. Advantageous configurations are the subject matter of the following description.

In particular, the method according to the disclosure makes use of negative error dependencies between measuring devices of a measuring system, whereby lower total failure probabilities are made possible than by pure independence of the measuring devices. Possible external influences (ambient conditions) on the measuring system are considered so that the robustness thereof can be increased. Further, by taking into account negative error dependencies, a quantity of redundant measuring devices can be reduced without sacrificing safety.

The disclosure unfolds particular advantages in measuring systems in vehicles, because the aim is to achieve the highest possible reliability, in particular for critical measuring systems, in particular those where the failure thereof results in danger to persons. The disclosure is particularly suitable for perception systems as measuring systems having perception devices as measuring devices for capturing an environment as measurement information. The disclosure may be advantageously used for vehicle-linked and non-vehicle-linked perception systems, e.g., for those monitoring an infrastructure, e.g., a road intersection, etc., or for general monitoring.

For example, if a measuring system PS comprises a first and a second measuring device PV1, PV2 for capturing measurement information, a probability of failure of the entire measuring system PS can be determined by combining the failure probabilities of the two measuring devices PV1, PV2 as follows:

$$P(PS) = P(PV1 \cup PV) = P(PV1) * P(PV2 \mid PV1) \quad (1)$$

If the failure probabilities of the two measuring devices PV1, PV2 are independent, the following applies:

$$P(PV2 \mid PV1) = P(PV2) \quad (2)$$

However, the term of the conditional probability of the second measuring device PV2 can also be divided into two ranges, each having a positive or a negative dependence on the probability of failure of the first measuring device PV1.

The range for a positive dependence of the second measuring device PV2 on the first measuring device PV1 can be defined as follows:

$$P(PV2) < P(PV2 \mid PV1) < 1 \quad (3)$$

It follows that the probability of failure of the second measuring device PV2 is higher if the first measuring device PV1 has already failed. This may occur, for example, if both measuring devices PV1, PV2 comprise sensors of the same type differing only in terms of the measurement tolerances thereof. In this case, if the first measuring device PV1 fails, e.g., due to present ambient conditions such as weather or light conditions, the probability increases that the second measuring device PV2 will also fail.

However, correspondingly, a range for a negative dependence of the second measuring device PV2 on the first measuring device PV1 may also be defined:

$$0 < P(PV2 \mid PV1) < P(PV2) \quad (4)$$

In this case, the probability of failure of the second measuring device PV2 decreases if the first measuring device PV1 has already failed. This may occur, for example, if both measuring devices PV1, PV2 contain sensors of different types, one of which is negative and one of which is positive for the present ambient conditions.

The measuring system to be created comprises at least two measuring devices, which may be, for example, a camera device, a radar device, a lidar device, an ultrasonic device, or any other suitable device for capturing the measurement information of interest. In particular, the measuring system may comprise a plurality of measuring devices. Each measuring device may comprise at least one sensor (e.g., a camera, a radar, lidar or ultrasonic sensor, etc.) as well as a corresponding evaluation unit. The evaluation unit may be configured to calculate at least one evaluation algorithm for deriving the required measurement information from the sensor signals. For example, the evaluation algorithm may include AI functions taught by way of a plurality of environmental data of the vehicle. Each measuring device may comprise a dedicated evaluation unit or there may be a common evaluation unit for a plurality or all of the measuring devices in the measuring system. In particular, the at least two measuring devices may be redundant, i.e. said devices may capture a common area surrounding the vehicle.

For the method according to the disclosure, at least one ambient condition is identified that affects a function of the at least two measuring devices of the measuring system ("common cause"). For example, the ambient condition may be a weather condition (rain, fog, snow, direct sun exposure, etc.) or a change in light conditions caused by time/location (time of day, tunnel passage, etc.) interacting with the sensors of the measuring devices. For example, the identification of the at least one ambient condition may be based on expert knowledge stored in a database. Alternatively or additionally, the at least one ambient condition may be identified based on vehicle data measured beforehand and stored in a database by way of corresponding algorithms (e.g., correlation coefficient, causal inference, etc.). In particular, a plurality of ambient conditions affecting the function of the at least two measuring devices may be identified.

Upon identification of the at least one ambient condition, a failure probability of the measuring system in case of presence of the ambient condition is determined, taking into account a positive and/or a negative error dependence between the at least two measuring devices of the measuring system. For this purpose, the failure probability of the measuring system may be determined, for example, at first by assuming the present error dependence between the at least two measuring devices. If, for example, the identified ambient condition has a positive error dependence, the probability of failure can also be determined for a negative error dependence in order to determine a potential for reducing the probability of failure. If negative error dependence is already present, in contrast, the probability of failure can be determined for positive error dependence in order to determine the influence thereof on a potential increase in the probability of failure. Said procedure may be repeated for each ambient condition identified.

According to one embodiment, the determination of the failure probability of the measuring system may be performed by way of a probabilistic directed model (PGM). In particular, a Bayesian network can be created for this purpose, depicting the measuring system having the at least two measuring devices as well as the at least one ambient condition. A structure of the Bayesian network can be created, for example, using expert knowledge stored in a database or using vehicle data measured in advance and stored in a database by way of corresponding algorithms (e.g., Structure Learning, Causal Discovery, etc.). Likewise, the model can be parameterized either based on expert knowledge (Expert Judgment) or based on data (e.g., using Parameter Learning). By applying the Bayesian network, it can in particular be determined what optimization potential is present in the measuring system by introducing/increasing the negative error dependence between the at least two measuring devices.

According to the present disclosure, at least one of the at least two measuring devices is adjusted such that the negative error dependence between the at least two measuring devices is increased. In other words, the measuring devices may in particular be configured such that a failure of a first device under the influence of the identified ambient condition does not result in an increased, but rather a reduced, failure probability of a second device.

According to one embodiment, the negative error dependence between the at least two measuring devices may be increased by using a first sensor in a first measuring device and a second sensor, different from the first sensor, in a second measuring device. For example, the first and second sensors may differ in terms of the physical measurement principle thereof (acoustic, electromagnetic, optical, etc.). For example, the first sensor may be an imaging sensor (e.g., a camera) and the second sensor may be a ranging sensor (e.g., a radar or lidar sensor). Alternatively or additionally, the first sensor may be an active sensor and the second sensor may be a passive sensor. When using two ranging sensors, for example, said sensors may differ in wavelength (infrared radiation, visible radiation, radar waves).

Alternatively or additionally, the negative error dependence between the at least two measuring devices may be increased by installing an interface in the measuring system by way of which external (non-system) sensor signals can be received. For example, the interface may be present in one or more evaluation units of the measuring system. This allows access to sensor signals or a use of sensor signals provided, for example, by an infrastructure (e.g., by roadside units) or other vehicles. In particular, signals differing from the signals from the native measuring devices may be accessed in order to induce a negative error dependence. For example, a radar signal of a roadside unit may be received as a redundant signal to a camera signal of the vehicle. By installing an interface in the measuring system, the probability of failure thereof in operation can be reduced when depending on external measuring devices available in the system environment.

Alternatively or additionally, the negative error dependence between the at least two measuring devices may be increased by adjusting an evaluation algorithm in at least one of the at least two measuring devices, or by the evaluation algorithms of the at least two measuring devices differing from each other. This can be done, for example, by a corresponding selection of the evaluation algorithm. For example, if algorithms based on artificial intelligence (AI) are used, a data set or hyperparameters of the evaluation algorithm may be adjusted to establish or increase a negative error dependence between the at least two measuring devices. For example, the at least two measuring devices or the evaluation algorithms thereof may be trained by way of different data sets, a first having a greater number of data points at a first ambient condition (e.g., day) and a second having a greater number of data points at a second ambient condition (e.g., night). As a result, the measuring device trained on the first data set has a higher accuracy in the presence of the first ambient condition and a lower accuracy in the presence of the second ambient condition. The measuring device trained on the second data set, on the other hand, has a higher accuracy in the presence of the second ambient condition and a lower accuracy in the presence of the first ambient condition, whereby a negative dependence can be achieved in the two measuring devices in total.

In addition to adjusting the evaluation algorithm itself or the architecture thereof as described above, the negative error dependence between the at least two measuring devices can be increased by adjusting at least one parameter of the evaluation algorithm in at least one of the at least two measuring devices, or by distinguishing at least one parameter of the evaluation algorithm of the at least two measuring devices. For example, a contrast of a camera and/or a detection threshold of an AI function may be increased or decreased. Thus, even when using identical sensors or sensor types, negative error dependencies are achieved between the measuring devices. For example, when using neural networks, the layer depth and layer size thereof can be adjusted.

The effects of the individual measures described above on the probability of failure of the measuring system can be checked, for example by way of the Bayesian network, i.e. the Bayesian network can be re-parameterized according to the selected adjustment and the probability of failure again determined.

According to one embodiment, the at least one of the at least two measuring devices is adjusted when, and in particular only when, the particular failure probability, in particular the failure probability determined using the present failure dependence, exceeds a predetermined value. If, for example, a positive error dependence exists between the at least two measuring devices in the identified ambient condition, the additionally determined failure probability with negative error dependence can be applied to utilize the potential thereof to reduce the failure probability.

Furthermore, according to the present disclosure, the measuring system is created having the at least two measuring devices. This should in particular be understood as that a design or a blueprint is defined for the measuring system. Alternatively or additionally, actually physically producing the measuring system from the same is comprised.

According to one embodiment, the measuring system is created when, and in particular only when, the particular probability of failure goes below or at least does not exceed a predetermined value.

According to one embodiment, the measuring system may be created when, and in particular only when, the probability of failure for all relevant and identified ambient conditions goes below or at least does not exceed the predetermined value. By way of said embodiments, a measuring system having a desired maximum failure probability is obtained.

According to one embodiment, determining the failure probability may comprise determining a marginal total failure probability and determining a conditional total failure probability of the measuring system. In this case, a first predetermined value for the marginal total probability of failure and a second predetermined value for the conditional total probability of failure may be established, and creating the measuring system may only occur, for example, when said probabilities fall below the two predetermined values. Alternatively, the measuring system may be created when at least one of the two probabilities falls below the predetermined value.

The marginal total probability of failure may be determined, for example, by way of the belief propagation algorithm or the variable elimination algorithm. The conditional total failure probability for the measuring system may be determined, in particular, for all identified ambient conditions. In this way, it can be assessed whether a sufficiently low marginal total failure probability and additionally no significant increase due to the identified ambient conditions has been achieved. Said evaluation allows a measuring system to be rated as sufficiently safe for highly automated driving.

Creating the measuring system may in particular comprise selecting/assembling and parameterizing redundant measuring devices (sensor and evaluation unit), having been adjusted as described above, in order to increase the negative error dependencies thereof and to fall below the predetermined value of the probability of failure in combination.

In other words, an architecture for a measuring system can be created/designed/optimized using the described method and subsequently produced. Some embodiments of the method also provide the ability to reduce the failure probability of the measuring system even during operation thereof. For example, the parameters of individual measuring devices (e.g., a contrast of a camera or a detection threshold of an AI function in an evaluation algorithm) may be adjusted based on new data in the installed state of the measuring system.

A computing unit according to the disclosure is configured, in particular in terms of programming, to perform a method according to the disclosure. In particular, the computing unit may comprise an input device, a calculation device, and an output device. The calculation device may comprise the processor, a working memory (RAM), and a read only memory (ROM), and may be configured to model a measuring system having at least two measuring devices. In particular, the calculation device may be configured to calculate failure probabilities of the measuring system by way of a probabilistic directed model (PGM), in particular a Bayesian network.

The input device of the computing unit may comprise a keyboard for manual inputs, as well as one or more data interfaces for receiving data (environmental data for training AI functions, recorded vehicle data, expert knowledge, etc.) from external databases. In particular, the input device may be connected to the external databases by way of a wired connection and/or a radio connection.

Alternatively, the databases may be present in the computing unit so that the calculation device can directly access the data stored therein.

The output device of the computing unit may comprise a display screen on which calculation results are displayed, by way of which the measuring devices can be appropriately selected/parameterized. Furthermore, the output device may comprise one or more data interfaces by way of which calculation results may be sent to external output units, for example. This may be done by way of a wired connection and/or a radio connection. For example, calculation results of the PGM may be sent to an output unit in a production facility to adjust therein a parameterization of the produced measuring systems.

The computing unit may be one or more separate computing units. Alternatively or additionally, the computing unit may be integrated in a vehicle control unit in order to be able to adjust parameters of the evaluation algorithms even while the vehicle is in operation. For example, in vehicle operation, environmental data of the vehicle may be collected continuously or intermittently based on, and a new ambient condition may be identified on the basis thereof. By way of the PGM, the selection probability of the measuring system can be determined when the new ambient condition is present and the parameters of one or more redundant measuring devices are adjusted such that a negative error dependence exists between said parameters even in said ambient condition as well and a predetermined value of the probability of failure is not exceeded. In this context, for example, a plurality of parameter sets for a measuring device may be stored in the vehicle controller depending on the identified ambient conditions. The parameter sets may in particular comprise parameters of the evaluation algorithm but also setting parameters of the sensors of the measuring device.

The implementation of a method according to the disclosure in the form of a computer program or computer program product comprising program code for performing all of the method steps is also advantageous because this results in particularly low costs, especially if an executing control device is still used for other tasks and is therefore provided in any event. Lastly, a machine-readable storage medium is provided, on which a computer program as described above is stored. Suitable storage media or data carriers for providing the computer program are, in particular, magnetic, optical, and electric storage media, such as hard disks, flash memory, EEPROMs, DVDs, and others. Downloading a program via computer networks (internet, intranet, etc.) is also possible. Such a download can take place in a wired, or cabled, or wireless manner (e.g., via a WLAN, a 3G, 4G, 5G, or 6G connection, etc.).

Further advantages and embodiments of the disclosure will emerge from the description and the accompanying drawings.

The disclosure is shown schematically in the drawings on the basis of exemplary embodiments and is described hereinafter with reference to the drawings.

DETAILED DESCRIPTION

In the figures, identical elements are marked with identical reference signs. Therefore, a repetitive description is omitted where possible.

Figure 1:
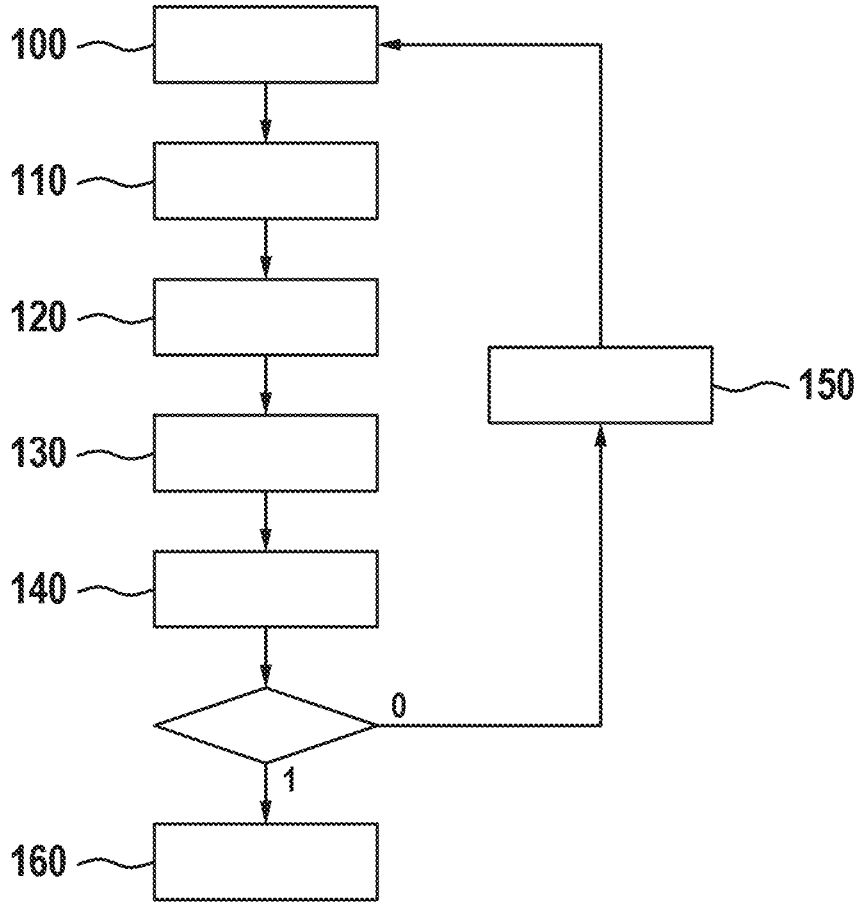
FIG. 1 shows a flow chart having method steps according to an exemplary embodiment of the disclosure.

FIG. 1 shows a flow chart having method steps for creating a perception system for a vehicle as a measuring system according to an exemplary embodiment of the disclosure.

The perception system comprises at least two perception devices as measuring devices, for example, a camera device, a radar device, a lidar device, an ultrasonic device, or any other suitable device for capturing the environment of the vehicle. In particular, the at least two perception devices may be redundant, i.e. said devices may capture a common region in an environment of the vehicle. Each perception device may comprise at least one sensor (e.g., a camera, a radar, lidar or ultrasonic sensor, etc.) as well as a corresponding evaluation unit. Each perception device may comprise a dedicated evaluation unit or there may be a common evaluation unit for a plurality or all of the perception devices in the perception system.

In a first step 100 of the method shown, at least one ambient condition affecting a function of the at least two perception devices of the perception system ("common cause") is identified. The ambient condition may be, for example, a weather condition (rain, fog, snow, direct sunlight, etc.) or a change in light conditions due to a time/location (time of day, tunnel passage, etc.) interacting with the sensors of the perception devices. For example, the identification of the at least one ambient condition may be based on expert knowledge stored in a database. Alternatively or additionally, the at least one ambient condition may be identified based on vehicle data measured beforehand and stored in a database by way of corresponding algorithms (e.g., correlation coefficient, causal inference, etc.).

To determine a probability of failure of the perception system having the at least two perception devices, a probabilistic directed model, in particular a Bayesian network, may be created in a next step 110, depicting the perception system having the at least two perception devices as well as the at least one ambient condition.

By way of the Bayesian network, a probability of failure of the perception system in the presence of the ambient condition may be determined in a further step 120, wherein a positive and/or a negative error dependence between the at least two perception devices of the perception system is considered. For this purpose, the probability of failure of the perception system may first be determined, for example, assuming the present error dependence between the at least two perception devices. If, for example, the identified ambient condition has a positive error dependence, the probability of failure can also be determined for a negative error dependence in order to determine a potential for reducing the probability of failure.

Based on the potential determined in this way, in step 130 an optimization of the perception system may be carried out by adjusting at least one of the perception devices such that a negative error dependence between the at least two perception devices is brought about or increased for the identified ambient condition. For example, different sensors may be used in the perception devices, differing in terms of the physical measurement principle thereof (acoustic, electromagnetic, optical, etc.). For example, the first sensor may be an imaging sensor (e.g., a camera) and the second sensor may be a ranging sensor (e.g., a radar or lidar sensor).

In addition, the negative error dependence between the at least two perception devices may be increased in that an interface is installed in the perception system by way of which external sensor signals can be received. This allows access to sensor signals or a use of sensor signals provided, for example, by an infrastructure (e.g., by roadside units) or other vehicles. In particular, such signals differing from the signals from the on-board perception devices may be accessed in order to induce a negative error dependence. In addition, the negative error dependence between the at least two perception devices may be increased by adjusting a perception algorithm or parameters of the perception algorithm in at least one of the at least two perception devices. For example, a contrast of a camera and/or a detection threshold of an AI function may be increased or decreased. Thus, even when using identical sensors/types of sensors, negative error dependencies may be achieved between the perception devices.

In a further step 140, the effects of the individual measures described above on the probability of failure of the perception system may be checked by way of the Bayesian network, i.e., the Bayesian network may be re-parameterized according to the selected adjustment and the probability of failure again determined.

If the determined probability of failure falls below a predetermined value, branch "1", the method proceeds to step 160 and the perception system is created. In the other case, branch "0", the method jumps to step 150, in which a revision of the architecture of the perception system is carried out, for example by adding an additional perception device.

Then, in step 100, the method begins anew and repeats the optimization actions until the determined failure probability (140) falls below the predetermined value.

Steps 110 to 140 may be repeated for a plurality of ambient conditions identified in step 100. In that case, the system may be created (160) if the negative error dependence between the at least two perception devices has been brought about or optimized for all identified ambient conditions. For example, multiple parameter sets for a perception device may be stored depending on the identified ambient conditions. The parameter sets may in particular comprise parameters of the perception algorithm but also setting parameters of the sensors of the perception device.

Figure 2A:
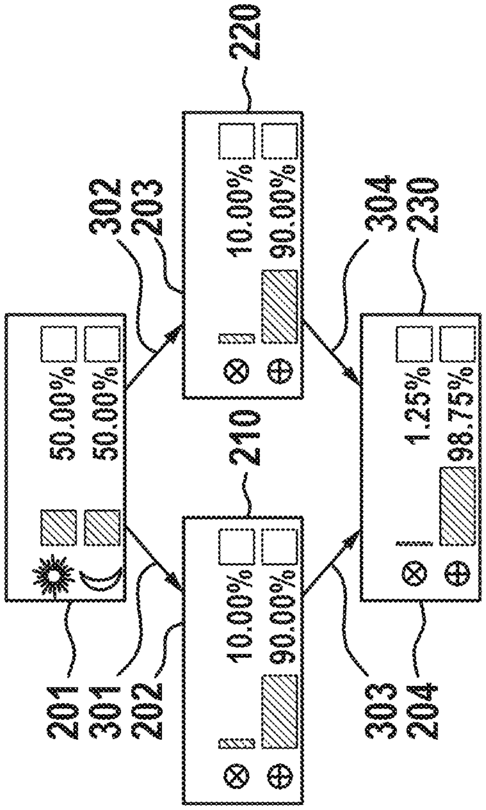
FIGS. 2*a* and 2*b* schematically show a Bayesian network by way of which a probability of failure of a perception system having two redundant perception devices according to an exemplary embodiment of the disclosure can be determined.
Figure 2B:
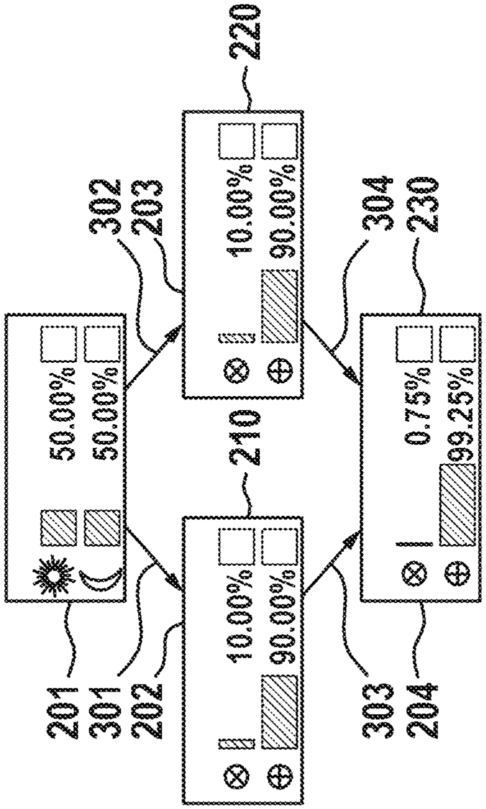

FIGS. 2*a* and 2*b* schematically show a Bayesian network by way of which a probability of failure of a measuring system having two redundant measuring devices according to an exemplary embodiment of the disclosure can be determined. The Bayesian network shown comprises four nodes 201 to 204 having random variables and four edges 301 to 304 representing the error dependencies between the random variables. The first node 201 comprises a first ambient condition, here, for example, the time of day, the second node 202 comprises a first measuring device 210, the third node 203 comprises a second measuring device 220, and the fourth node 204 comprises a measuring system 230 consisting of a fusion of the two measuring devices 210, 220. The failure probabilities of the two measuring devices 210 and 220 are dependent on time of day, so the first node 201 is connected to the second and third nodes 202, 203 by way of edges 301, 302. The selection probability of the measuring system 230, in turn, depends on the failure probability of the two measuring devices 210, 220, resulting in the edges 303 and 304.

Each of the measuring devices 210, 220 has a failure probability (false negative, FN, symbol "⊗") of 10% and a functional probability (correct positive, symbol "⊕") of 90%, resulting in a total failure probability of the measuring system 230 of 10%*10%=1% when the measuring devices 210, 220 are independent. The time of day affects both measuring devices 210, 220 as the ambient condition.

In FIG. 2*a*, a positive error dependence is modeled between the measuring devices 210, 220, resulting in a higher total false-negative failure probability P(FN) than would be the case for independent measuring devices 210, 220 (P(FN)=1.25%>1%). In FIG. 2*b*, on the other hand, a negative error dependence is modeled between the measuring devices 210, 220, leading to a lower total probability of failure than would be the case for independent measuring devices 210, 220 (P(FN)=0.75%<1%). The marginal probability of failure of the individual measuring devices 210, 220 remains unchanged at 10% in both examples.

Figure 3B:
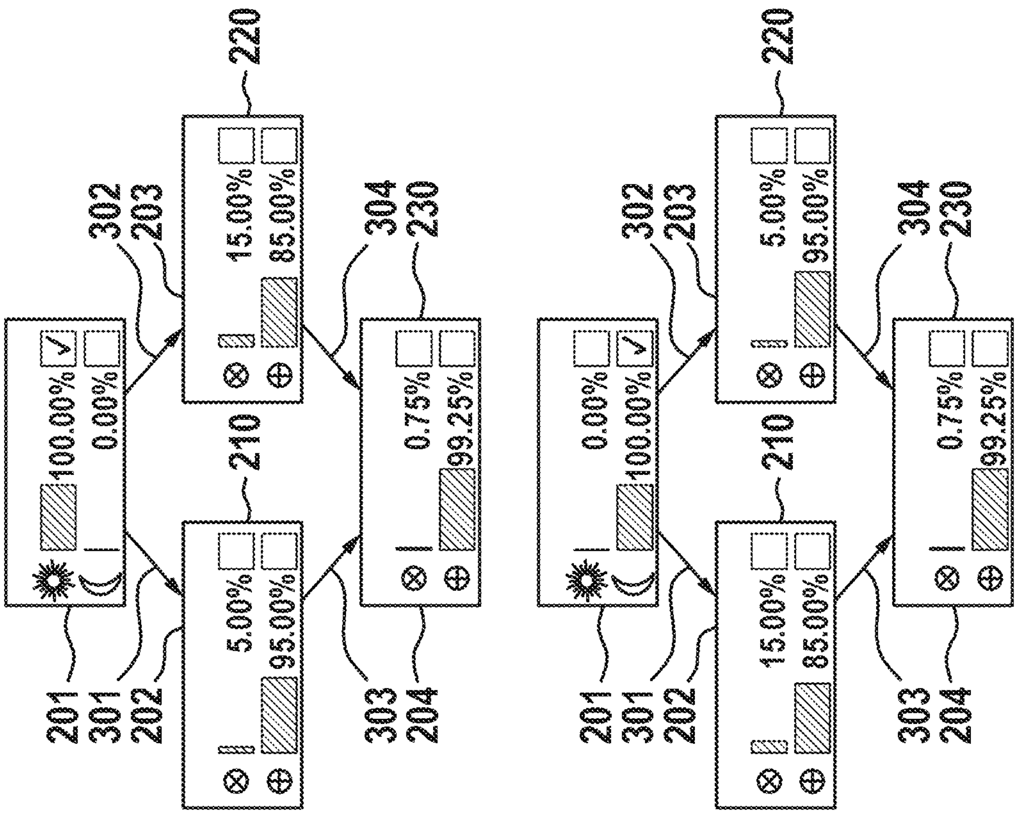
FIGS. 3*a* and 3*b* schematically show the Bayesian network from FIGS. 2*a* and 2*b* having changed parameters.
Figure 3A:
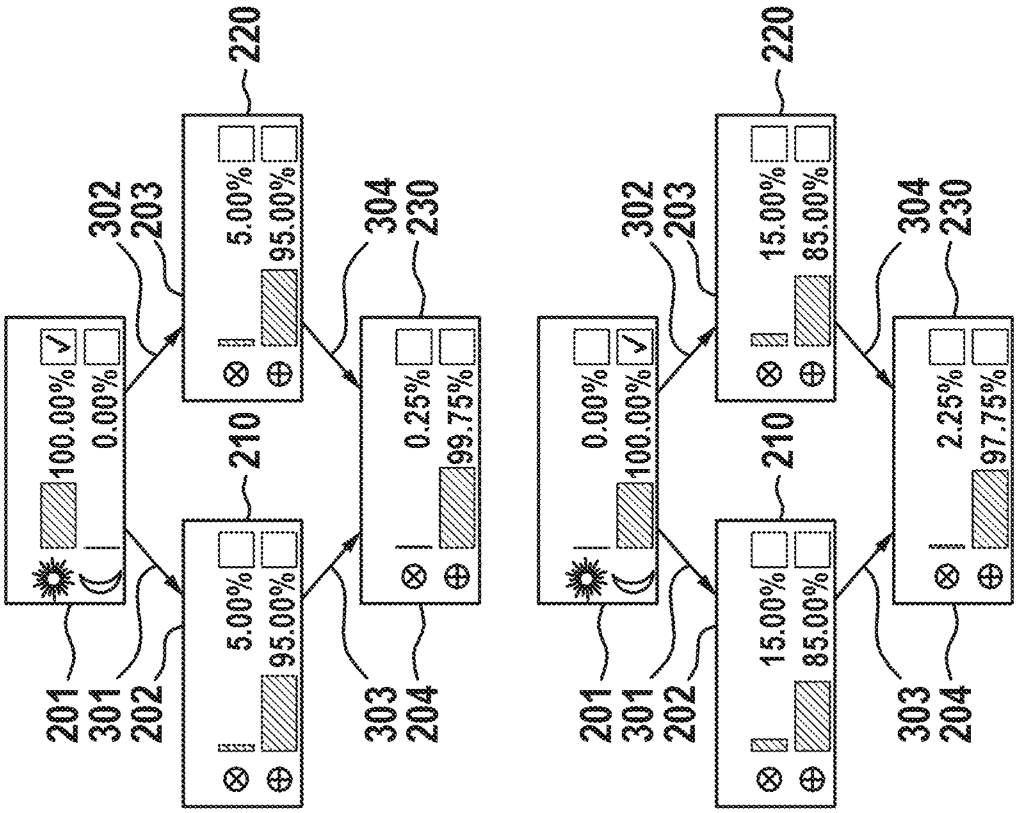

FIGS. 3*a* and 3*b* schematically show the Bayesian network from FIGS. 2*a* and 2*b* having changed parameters. Hard evidence for the time of day is introduced into the Bayesian network having the positive error dependence (FIG. 3*a*) and the Bayesian network having the negative error dependence (FIG. 3*b*). In both FIGS. 3*a*, 3*b*, the failure probabilities for the day time (Sun icon=100%) are indicated at the top and the failure probabilities for the night time (Moon icon=100%) are indicated at the bottom.

It is clear that for positive error dependence, the failure probabilities of both measuring devices 210, 220 become synchronously greater and lesser, respectively (FIG. 3*a*). This may be the case, for example, if the measuring devices 210, 220 comprise sensors of the same type, e.g., cameras, both having a lower failure probability during the day than during the night (5% during the day vs. 15% during the night). The total probability of failure is thus very different for positive error dependence as a function of the ambient condition "time of day" (0.25% for day vs. 2.25% for night), from which a systematic increase in the risk under changing ambient conditions can be concluded.

In contrast, for negative error dependence, there is an opposite behavior of the two measuring devices 210, 220 (FIG. 3*b*). This can be achieved, for example, by including in the two measuring devices 210, 220 sensors of different types, e.g., a camera in 210 and a radar sensor in 220. As a result, the failure probability of the first measuring device 210 during the daytime is 5% and that of the second measuring device 220 is 15%. At night, the failure probabilities reverse due to the sensor characteristics, and the failure probability of the first measuring device 210 is 15% and that of the second measuring device 220 is 5%. Due to said complementary increase/decrease in the failure probabilities of the two measuring devices 210, 220 having negative error dependence, the total probability of failure is constant in the present example, and the risk of failure of the entire measuring system under changing ambient conditions can be reduced.

What is claimed is:

1. A method for creating a measuring system having at least two measuring devices, the method comprising:
- repeating an iterative loop until a failure probability of the measuring system is determined to be below a predetermined value, the iterative loop including:
  - identifying at least one ambient condition affecting a function of the at least two measuring devices of the measuring system;
  - determining, with probabilistic directed model, the failure probability of the measuring system under the at least one identified ambient condition, taking into account a positive and/or a negative error dependency between the at least two measuring devices; and
  - adjusting at least one of the at least two measuring devices such that the negative error dependence is increased between the at least two measuring devices, in response to the failure probability exceeding the predetermined value; and
- creating the measuring system having the at least two measuring devices only in response to the failure probability being below the predetermined value.

2. The method according to claim 1, wherein the negative error dependence between the at least two measuring devices is increased by using a first sensor in a first measuring device of the at least two measuring devices and a second sensor differing from the first sensor in a second measuring device of the at least two measuring devices.

3. The method according to claim 1, wherein the negative error dependence between the at least two measuring devices is increased in that an interface is installed in the measuring system by way of which external sensor signals are received.

4. The method according to claim 1, wherein the negative error dependence between the at least two measuring devices is increased by adjusting an evaluation algorithm in at least one of the at least two measuring devices.

5. The method according to claim 4, wherein the negative error dependence between the at least two measuring devices is increased by adjusting at least one parameter and/or a type of the evaluation algorithm in at least one of the at least two measuring devices.

6. The method according to claim 1, wherein determining the probability of failure comprises determining a marginal total failure probability and determining a conditional total failure probability of the measuring system.

7. The method according to claim 1, further comprising adjusting the at least one of the at least two measuring devices when the determined failure probability exceeds a predetermined value.

8. A computing unit configured to carry out all method steps of a method according to claim 1.

9. A computer program causing a computing unit to carry out the method according to claim 1 when executed on the computing unit.

10. A non-transitory machine-readable storage medium having a computer program according to claim 9 stored thereon.

* * * * *